United States Patent [19]

Kaufmann

[11] Patent Number: 4,774,006

[45] Date of Patent: Sep. 27, 1988

[54] FLUID TREATMENT METHOD

[75] Inventor: Leonard A. Kaufmann, Aurora, Colo.

[73] Assignee: VerTech Treatment Systems, Inc., Denver, Colo.

[21] Appl. No.: 64,624

[22] Filed: Jun. 22, 1987

[51] Int. Cl.[4] .............................................. C02F 1/74
[52] U.S. Cl. .................................. 210/742; 210/747; 210/761; 210/766
[58] Field of Search ............... 210/742, 747, 758, 761, 210/149, 170, 177, 766

[56] References Cited

U.S. PATENT DOCUMENTS

| | | | |
|---|---|---|---|
| 3,449,247 | 6/1969 | Bauer | 210/761 |
| 3,606,999 | 9/1971 | Lawless | 210/761 |
| 3,853,759 | 12/1974 | Titmas | 210/761 |
| 4,229,296 | 10/1980 | Wheaton et al. | 210/177 |
| 4,272,383 | 6/1981 | McGrew | 210/761 |
| 4,564,458 | 1/1986 | Burleson | 210/761 |
| 4,671,351 | 6/1987 | Rappe | 165/133 |
| 4,692,252 | 9/1987 | Atwood et al. | 210/761 |
| 4,713,177 | 12/1987 | Atwood et al. | 210/761 |

Primary Examiner—Peter Hruskoci
Attorney, Agent, or Firm—Cullen, Sloman, Cantor, Grauer, Scott & Rutherford

[57] ABSTRACT

The subterranean treatment apparatus and methods disclosed herein are useful for treating various waste streams, including municipal and industrial streams. The disclosed apparatus and methods are particularly useful in determining and controlling the temperature of the reaction zone in a deep well reaction apparatus while avoiding fouling of thermocouples and permitting easy service and replacement. In the disclosed embodiment, a fluid quiescent zone is created in the heat exchanger of the treatment apparatus located within the reaction zone and the temperature is used to control the system by operation of the heat exchanger or control of the C.O.D. of the influent.

4 Claims, 3 Drawing Sheets

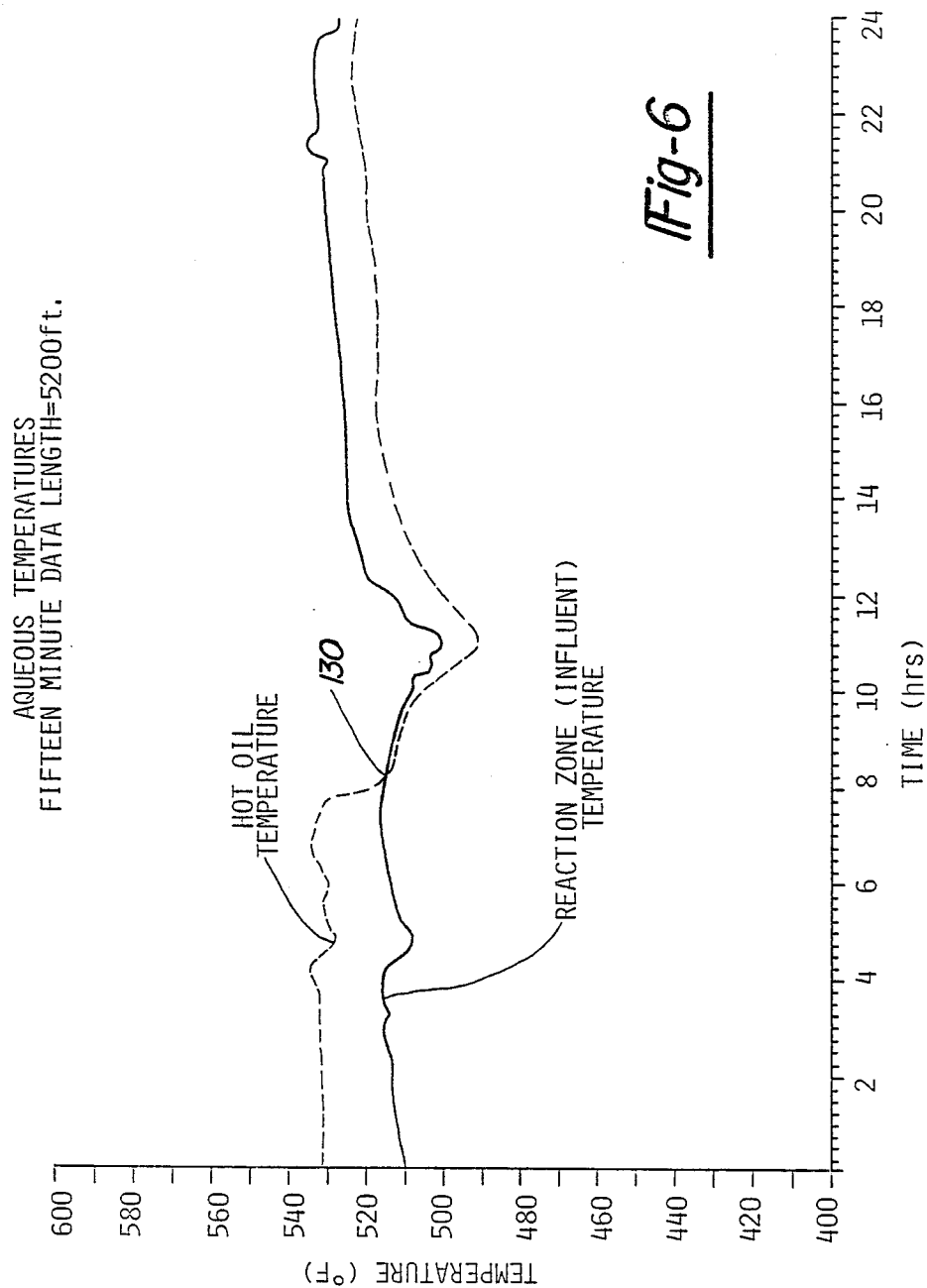

FLUID TREATMENT METHOD

BACKGROUND OF THE INVENTION

1. Field of the Invention

This invention relates to improved subterranean fluid treatment apparatus and methods for treatment of various materials, including municipal and industrial waste streams. More particularly, the present invention relates to downhole or deep well reaction apparatus and methods for reactive treatment of fluid waste streams, including municipal sludge and industrial waste.

2. Description of the Prior Art

Above ground wet oxidation systems have been in use for several years for the treatment of municipal sludge received from a sewage treatment process with limited success. The above ground wet oxidation systems use high pressure and heat to initiate the wet oxidation reaction, however, the apparatus is not energy efficient and results in only partial oxidation of the sludge; see, for example, U.S. Pat. Nos. 2,665,249 and 2,932,613. Further, because the extreme pressures must be generated by a piston, the apparatus is subject to failure. The above ground wet oxidation processes have not, therefore, replaced the traditional methods of treatment of municipal sludge, which includes aerobic and anaerobic treatment, settling, dewatering, drying, incineration, etc.

Various downhole or deep well fluid treatment systems have been proposed by the prior art, however, the first successful deep well reaction apparatus was built by the assignee of the present application based upon the disclosure in U.S. Pat. No. 4,272,383 of Dr. McGrew, entitled "Method and Apparatus for Effecting Subsurface, Controlled, Accelerated Chemical Reactions", which is assigned to the assignee of the present invention. A downnole fluid treatment system generally includes a plurality of nested pipes which extend vertically into the ground a predetermined depth to establish the desired pressure for treatment of the waste at the reaction temperature. The fluid to be treated is pumped into the vertical reaction pipes to form a hydrostatic column of fluid exerting a pressure sufficient to cause an accelerated reaction rate when the fluid is heated to the reaction temperature. Earlier prior art patents, including U.S. Pat. Nos. 3,449,247, 3,606,999 and 3,853,759, proposed various deep well reaction systems, however, these systems were never built or tested.

The above referenced patent of Dr. McGrew and the otner referenced prior art recognized that it is theoretically possible to substantially fully oxidize municipal and industrial wastes, including municipal sludge, at a deptn of approximately one mile, provided the concentration of the oxidizable material in the municipal sludge is balanced against the oxygen injected into the system. In the actual application of this concept in wet oxidation of municipal sludge, for example, considerable difficulties have been experienced in maintaining the reaction at the desired temperature and pressure to achieve maximum or optimum reduction of the chemical oxidation demand (C.O.D.) of the fluid waste stream. The temperature of the "reaction zone" located adjacent the lower extent of the reaction vessel must be continuously monitored to determine when the system becomes autogenic. Heat must be added to the influent to initiate the reaction. When the reaction becomes autogenic, heat is removed from the system to maintain the temperature of the reaction zone at the desired reaction temperature.

The above referenced patent of McGrew proposes a heat exchanger located within the nested tube reaction apparatus for adding or removing heat. This was an important breakthrough, however, temperature sensing means located within the reaction vessel become fouled or otherwise failed making temperature measurement difficult. Thermocouples permanently attached to the pipes within the reaction vessel, required removal of over 5000 feet of reaction apparatus to replace the thermocouples which also became fouled in a relatively short period of time. Further, additional means to control the temperature of the reactants in the reaction vessel have been found desirable.

There are pending several applications for patent relating to improvements in deep well reaction apparatus assigned to the assignee of the present application, the disclosures of which are incorporated herein by reference. For example, U.S. patent application Ser. No. 755,880, filed July 7, 1985, discloses the use of an insulated tubular in the heat exchanger for concentrating the heat adjacent the lower extent of the reaction vessel and limiting heat loss during removal of the heat. U.S. patent application Ser. Nos. 943,409, filed Dec. 19, 1986 and filed Mar. 24, 1986 disclose methods of inhibiting scale build-up and methods for cleaning the system to limit downtime. U.S. patent application Ser. No. 017,659 filed Mar. 24, 1987 discloses a method of continuous treatment in a downhole reaction apparatus wherein boiling is initiated in the upcomer to maintain the system at elevated temperatures.

The need, however, remains for improvements in determining and controlling the temperature of the reaction zone while avoiding fouling of thermocouples and permitting easy replacement of thermocouples when damaged or inoperative.

SUMMARY OF THE INVENTION

As described above, the basic components of a deep well reaction apparatus includes a plurality of nested pipes which extend vertically into the ground a predetermined depth to establish the desired pressure for treatment of waste streams at elevated reaction temperatures. In the preferred embodiments, the pipes are nested in telescopic heat transfer relation, wherein the influent, which includes the reactants, flows downwardly, preferably in the inner pipe, and the effluent, which includes the reaction products, flows upwardly, preferably in the outer pipe. This is the preferred circulation of the influent and effluent where a heat exchanger is located within the nested tubes, such that the hot heat transfer fluid is in heat transfer relation with the downflowing influent.

To avoid fouling, the temperature sensing means in one disclosed embodiment is preferably located in the heat exchanger rather than the reaction vessel because the heat exchange fluid is inert to thermocouples. The temperature of the flowing heat exchanger fluid is not, however, a reliable indicator of the temperature of the reaction vessel. Further, the temperature of the heat transfer fluid is increased or decreased to adjust the temperature of the reaction vessel. In a preferred embodiment of this invention, a fluid quiescent zone is created at the end of the heat exchanger within the reaction zone by spacing the central tube of the heat exchanger from the closed end of the outer tube a distance sufficient to stagnate the fluid flow and create a "quiescent zone". The temperature of the heat exchange fluid in this quiescent zone has been found to be a reliable indicator of the temperature of the reaction zone and therefore a temperature sensing means, such as a conventional thermocouple, is located within the quiescent zone, substantially eliminating thermocouple fouling problems and reducing the requirement for replacement of the sensing means.

Where the temperature sensing means, such as a thermocouple, is located within the reaction vessel, the thermocouple must be protected by a thermowell. The thermowell comprises a pipe having an open end which telescopically receives the thermocouple. As described above, the prior art teaches permanent attachment of the temperature sensing means to the nested pipes of the reaction vessel. Thus, the temperature sensing means cannot be removed from the system without pulling the pipes of the reaction vessel. The method of this invention solves this problem by releasably affixing the thermowell to one of the pipes, lowering the pipe into the ground for installation in the apparatus and then flowing a fluid into the apparatus which preferentially attacks the clamping means and releases the thermowell tube for later service. In the most preferred method of locating the thermocouple within the reaction vessel, the thermowell tube is releasably attached to a surface of one of the reaction vessel pipes by metal clamps, the pipe is lowered into position and an acid is used to remove the clamps and free the thermowell for service and replacement.

Having provided a reliable means for continuously monitoring the temperature of the reaction zone, it is now possible to more accurately maintain the temperature of the reaction at the desired temperature. Following initiation of the reaction by flowing hot heat transfer fluid downwardly through the heat exchanger, heat is preferably removed from the reaction zone by reversing the flow of the heat exchange fluid. Where a central insulated tubular is used in the heat exchanger, the heat may be efficiently removed by flowing the heat exchange fluid downwardly in the annular space between the center tube and the outer tube of the heat exchanger and circulating the heated heat exchange fluid upwardly through the center insulated tubular. It has been discovered that the temperature of the reaction zone may also be or alternatively adjusted by continually adjusting the C.O.D. of the influent, wherein the concentration of the principal reactant, for example municipal sludge, is increased where the temperature must be increased and the concentration of the principal reactant is reduced where the temperature should be reduced. This provides an additional means of adjusting the temperature of the reaction zone which may be utilized independently of a heat exchanger or as an additional means for adjustment of the temperature.

It has been further discovered that the temperature gradient across a pipe of the reaction vessel may be accurately determined and utilized to determine the scale build-up on the reaction vessel wall. This is accomplished by determining the temperature on opposed sides of a reaction vessel pipe at the same depth. An increase in the temperature gradient indicates an increase in the scale build-up.

Other advantages and meritorious features of this invention will be more fully understood from the following description of the preferred embodiments and methods of this invention, the appended claims, and the drawings, a brief description of which follows:

BRIEF DESCRIPTION OF THE DRAWINGS

FIG. 6 is a chart of reaction temperatures at 5000 feet versus time during initiation of a wet oxidation reaction.

DESCRIPTION OF THE PREFERRED EMBODIMENTS AND METHODS OF THIS INVENTION

Figure 1:
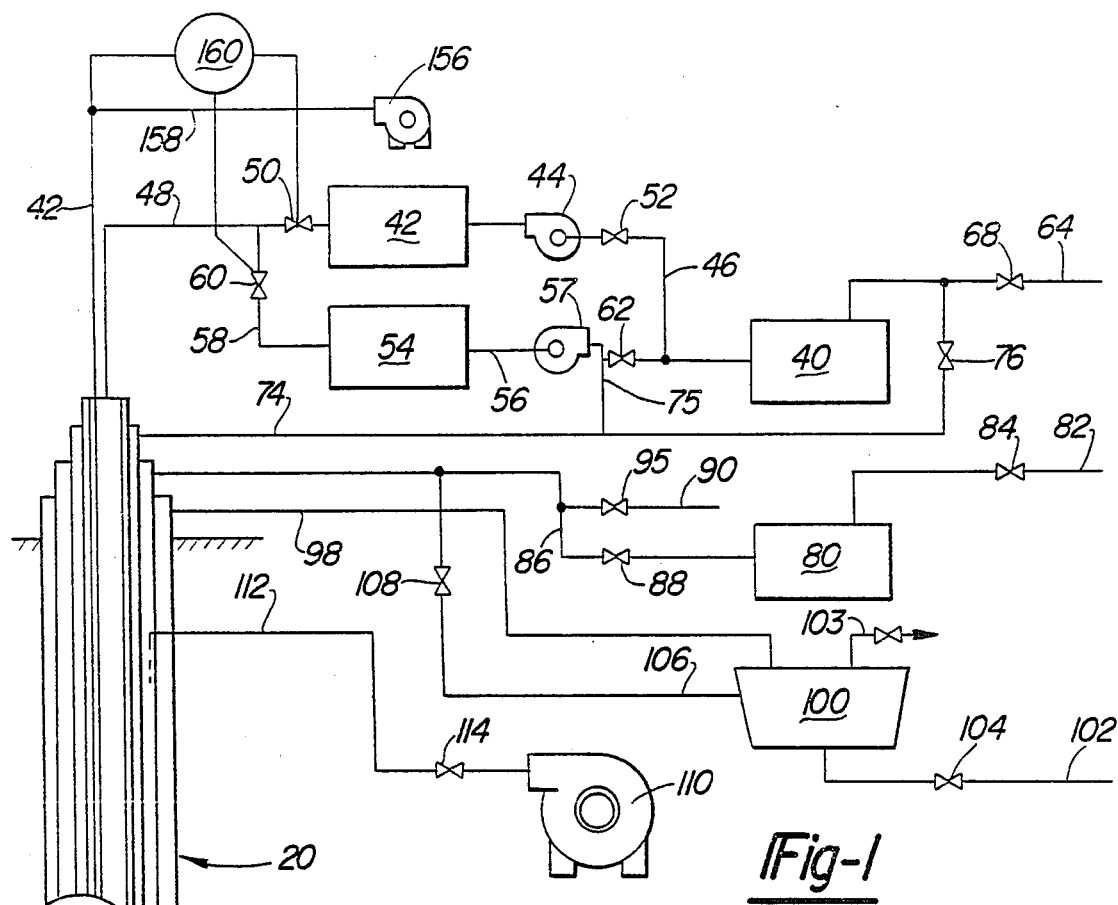
FIG. 1 is a schematic illustration of one embodiment of the continuous fluid treatment apparatus of this invention.
Figure 2:
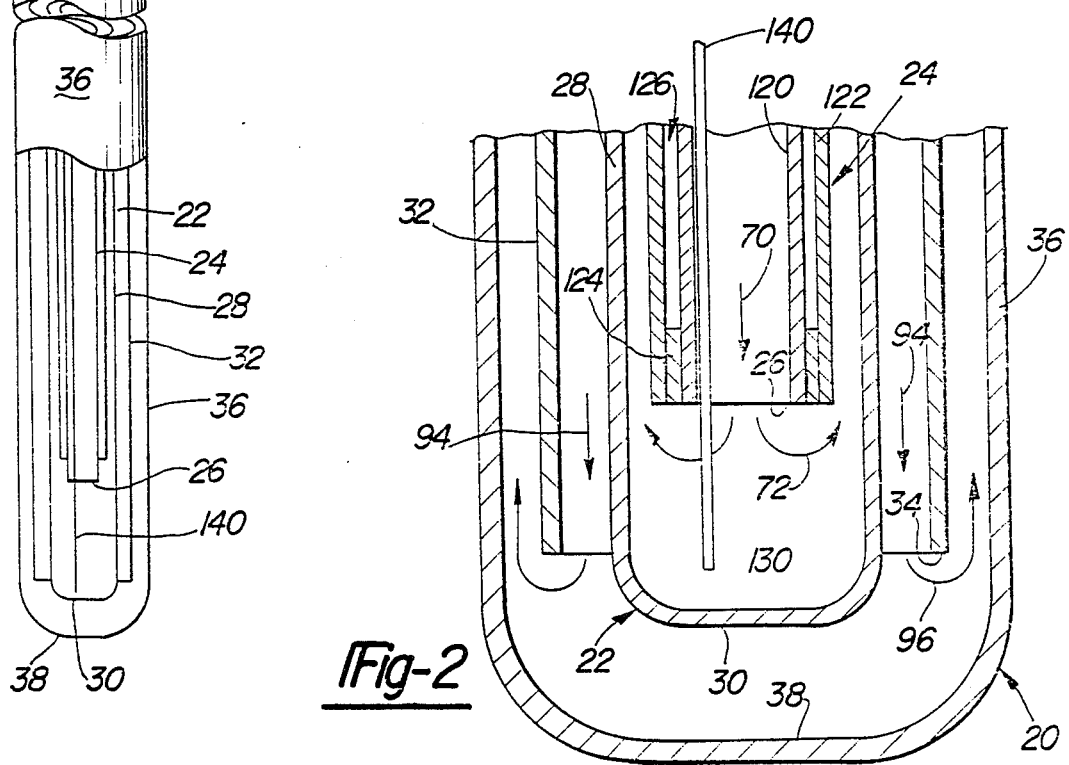
FIG. 2 is a cross-sectional view of the lower portion of the fluid treatment apparatus shown in FIG. 1.
Figure 3:
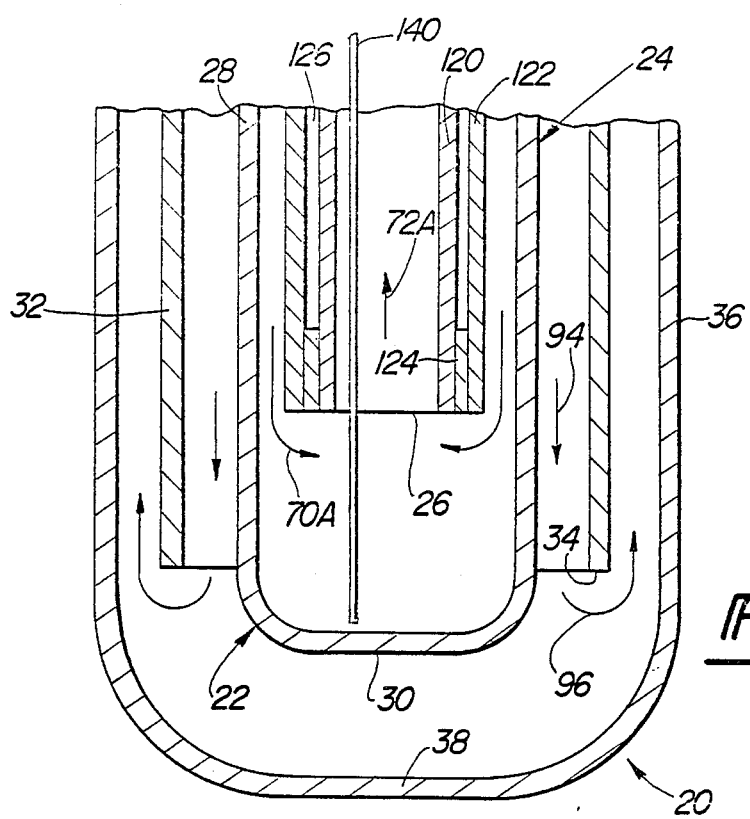
FIG. 3 is a cross-sectional view of the lower portion of the reaction apparatus, similar to FIG. 2, with the circulation in the heat exchanger reversed for cooling the reaction vessel.

The continuous fluid treatment apparatus 20 illustrated in FIGS. 1 to 3 is a vertical downhole or deep well fluid reaction apparatus suitable for treatment of various fluid streams, including but not limited to municipal and industrial waste. The illustrated fluid treatment apparatus has been used experimentally to treat municipal sludge wherein the primary reactant was sewage sludge dilluted in water and the secondary reactant was oxygen or air. As disclosed in the above-referenced McGrew patent, the fluid treatment apparatus generally comprises a plurality of generally concentric and telescopically nested pipes which extend vertically into the ground. In a treatment apparatus specifically designed for wet oxidation of municipal sludge, for example, the pipes may extend approximately one mile into the ground to form a hydrostatic column of fluid exerting a pressure sufficient to prevent boiling of the reactants in the downcomer pipe. It will be understood, however, that the reaction vessel may also be operated at supercritical temperatures and pressures to further accelerate the reaction in particular applications. Or more preferably, the liquid effluent may be selectively boiled in the upcomer pipe as described in the copending U.S. patent application Ser. No. 17,659, filed Feb. 24, 1987. Supercritical temperatures and pressures are not required for treatment of municipal sludge. The fluid treatment apparatus of this invention may also be used in various conversion reactions wherein a solid particulate, for example, is suspended in the circulating fluid. Further, the pipes are generally not continuous. Each pipe comprises a plurality of sections which are interconnected in serial alignment in a string, similar to the pipes in an oil well. In a typical municipal sludge wet oxidation application, the length of each pipe section is 40 feet long, the total length is about 5200 feet and the flow rate of the fluid being treated is about 80 to 400 gallons per minute.

In the disclosed embodiment of the fluid treatment apparatus, the heat exchanger 22 is located at the center of the nested pipes which comprise the fluid treatment vessel or reaction vessel. It will be understood, however, that the heat exchanger, being self-contained, may be located alongside an upcomer pipe, preferably within the downcomer pipe, in heat transfer relation with the downflowing influent. In the preferred embodiment, the innermost pipe 24 of the heat exchanger is an insulated tubular having an open end 26. As described more fully hereinbelow and in the above-referenced copending U.S. application Ser. No. 755,880, filed July 17, 1985, the insulated tubular 24 reduces radial heat transfer from downflowing hot heat transfer fluid in the insulated tubular to recirculating upwardly flowing heat transfer fluid in the annular space between the insulated tubular 24 and second pipe 28, as shown in FIG. 2. The circulation in the heat exchanger is reversed when the reaction becomes autogenic, as shown in FIG. 3. The insulated tubular then conserves the heat of reaction for other uses by preventing heat loss. In the disclosed embodiment, the insulated tubular 24 is generally concentric with and telescopically nested in second pipe 28 which has a closed end 30 spaced from the open end 26 of the insulated tubular providing a closed heat exchanger system. The fluid to be treated is then circulated around or in fluid heat transfer relation with the heat exchanger 22, as now described.

In the disclosed embodiment, a third pipe 32 having an open end 34 surrounds the second pipe 28 of the heat exchanger in generally concentric spaced telescopic relation. A fourth pipe 36 having a closed end 38 surrounds the third pipe 32 in spaced relation. The fluid to be treated, referred to as the influent, is circulated downwardly through downcomer pipe 32 in contact with the second pipe 28 of the heat exchanger 22. The treated fluid, referred to as the effluent, then flows through the open end 34 of the third pipe 32 and upwardly through the annular space between the downcomer pipe 32 and the upcomer pipe 36 in contact with the outer surface of the third pipe 32. As described more fully in the above-referenced McGrew patent, the fluid treatment apparatus creates a reaction zone in the lower portion of the apparatus when the reaction becomes autogenic, wherein the reaction is accelerated under heat and pressure. It will be understood, however, that the reaction apparatus of this invention is not limited to subcritical pressures and temperatures or particular reactants. For ease of explanation, however, the operation of the reaction apparatus will be described with regard to the subcritical wet oxidation treatment of sewage sludge.

FIG. 1 illustrates schematically suitable above ground components which may be utilized in the fluid treatment apparatus and processes of this invention. The heat exchange fluid, such as oil, water-steam or any suitable heat transfer fluid, is stored in a reservoir tank 40. For ease of description, the heat transfer fluid may be referred to below as oil, which is preferred in many applications. The oil is heated in a heater 42, such as a conventional gas fired heater. The oil is pumped by pump 44 from reservoir 40 through line 46 to heater 42 and the rate of flow is controlled by valve 52. The heated oil is then transferred through line 48 to the insulated tubular 24 of the heat exchanger 22 and the rate of flow is controlled by valve 50. The heat transfer fluid is then returned through line 74 from second pipe 28 to reservoir 40 for recirculation, as described. When heat is to be removed from the system, such as when the reaction becomes exothermic, the circulation in the heat exchanger 22 may be reversed, as shown in FIG. 3, wherein the heated oil is received from the insulated tubular 24 through line 48 and transferred through line 58 to the oil heat exchanger 54. As will be understood, this is accomplished by closing valve 50 and opening valve 60. The cooled heat exchanger fluid is then tranferred through line 56 and punped by pump 57 to the storage tank 40 or line 74 through line 75 and back to pipe 28 of the heat exchanger. The cooled heat transfer fluid is transferred to line 74 by closing valves 62 and 76.

During initiation of the reaction in the reaction vessel, heated oil is then supplied through line 48 into insulated tubular 24. As best shown in FIG. 2, the heated oil then flows downwardly through the insulated tubular as shown by arrow 70. The oil then flows out of the bottom open end 26 of the insulated tubular and the oil is recirculated upwardly through the annular space between the insulated tubular 24 and second pipe 28, as shown by arrows 72. The heat transfer fluid is then discharged from the top of pipe 28 through line 74 back to the reservoir 40 through valve 76. When the circulation in the heat exchanger 22 is reversed, as shown in FIG. 3, the heat transfer fluid flows downwardly through the annular space between second pipe 28 and the insulated tubular 24, as shown by arrows 70A and upwardly through insulated tubular, as shown by arrow 72A.

The fluid to be treated, such as municipal or industrial waste streams, is supplied to third pipe 32 and circulates downwardly around the heat exchanger 22 in the annular space between the second pipe 28 of the heat exchanger and pipe 32 sometimes referred to as the downcomer. As shown in FIG. 1, the fluid to be treated is stored in reservoir tank 80. The fluid to be treated, such as municipal sludge, is received through line 82 and the flow is controlled by valve 84. The fluid sludge is then delivered to the apparatus through line 86 and line 88. The fluid sludge is preferably diluted with water or liquid effluent from the municipal wastewater treatment plant delivered through line 90 and valve 92. The fluid sludge is preferably diluted to control the percentage of oxidizable material delivered to the fluid treatment apparatus. The effluent from the reaction vessel may also be used to dilute the sludge. The diluted sludge, fluid waste or other fluid to be treated then flows downwardly through pipe 32 in contact with the outer wall 28 of the heat exchanger 22, as shown by arrows 94. As described, pipe 32 has an open end 34 and the effluent then flows upwardly through the annular space between the outer pipe 36 and pipe 32 for discharge from the fluid treatment apparatus as shown by arrow 96. As shown in FIG. 1, the effluent is discharged from pipe 36 through line 98 to tank 100. Where the apparatus is used for wet oxidation of sewage sludge, for example, tank 100 is preferably a settling tank where the substantially inter ash is separated from the effluent fluid and gas. The ash may be drawn off through line 102 and the rate of flow is controlled by valve 104.

In a wet oxidation reaction apparatus, the supernatant may be drawn off through line 106 and used as a diluent in the process. Gas may be removed through line 103. As shown in FIG. 1, the supernatant is drawn off through line 106 and delivered to line 86, which communicates with pipe 32. The rate of flow and dilution is then controlled by valve 108. The second reactant, which is air or oxygen in the wet oxidation of sewage sludge, for example, may be injected into the downflowing stream of the influent through line 112. The disclosed embodiment includes an air or gas compressor 110 and the rate of flow is controlled by valve 114. As will be understood, the second reactant may be alternatively delivered through line 86 where the reactant is a liquid, for example, premixed in storage tank 80. Further, in many applications, oxygen is preferred as the second reactant, as disclosed in copending U.S. application Ser. No. 010,060, filed Feb. 2, 1987.

As described, the fluid treatment apparatus of this invention is primarily intended to treat fluid waste at elevated temperatures and pressures. The pressure is provided by the hydrostatic column of fluid in the reaction vessel. When the reaction is autogenic, the temperature is provided by the heat of reaction. During initiation of the reaction, however, heat must be added to the influent in the downcomer, preferably within the lower portion of the reaction vessel, creating a reaction zone. In a typical wet oxidation reaction of municipal sludge, for example, the downhole reaction temperature is approximately 500° F. Thus, oil delivered to the reaction zone should be in excess of 500° F. In a typical wet oxidation reaction, the oil will be delivered to the inlet of the insulated tubular 24 at a temperature of about 700° F. The oil or other heat transfer fluid then flows downwardly to the open end 26 of the insulated tubular where the heat is delivered to the second pipe 28 of the heat exchanger at a temperature of about 525° to 550° F. The fluid then flows upwardly through pipe 28, as shown by arrow 72 in FIG. 2, and the hot heat transfer fluid heats the downflowing influent in contact with the outer surface of pipe 28 in pipe 32. The temperature of the oil at the top exit of pipe 28 is then about 150° F. As described, the fluid reaction occurs in a reaction zone where the temperature of the influent exceeds about 350° F.

As will now be understood, the use of an insulated tubular conserves the heat of the hot oil for delivery to the reaction zone. Similarly, when the reaction becomes exothermic, the heated oil or other heat transfer fluid is delivered to the lower end of the insulated tubular 24, as shown by arrow 70A in FIG. 3, and the heated oil flows upwardly through the insulated tubular, as shown by arrow 72A in FIG. 3. Thus, the insulated tubular conserves the heat of reaction, which may be used for other purposes, including the generation of electricity, chemical reactions, etc. A suitable embodiment of the insulated tubular 24 is described in copending U.S. patent application Ser. No. 755,880, filed July 17, 1985. Briefly, the insulated tubular includes an inner tube 120, an outer tube 122 and cylindrical spacer members 124 which define an annular insulating space 126 between the tubes. The space 126 may be filled with an inert gas or any suitable insulating material.

Having described the general construction and operation of the fluid treatment apparatus 20 and the above ground components, as shown in FIG. 1, it will be understood that accurate temperature monitoring of the reaction zone is very important to successful operation of the reaction vessel, which includes downcomer pipe 32 and upcomer pipe 36. Various means for monitoring the temperature of the reaction vessel have been tried, including conventional thermocouples located within the reaction vessel. Such thermocouples are normally affixed within the upcomer or downcomer pipes for measurement at various depths and control of the system. As described, however, the thermocouples become fouled with scale, influent materials and reaction products, making the thermocouples inoperative. Where the thermocouples are permanently affixed to the downcomer or upcomer pipes, the pipes must be pulled to service the thermocouples, keeping in mind that the pipes in a municipal sludge wet oxidation reaction apparatus are a mile deep. More often, an attempt is made to monitor the reaction by measuring the temperature of the influent and affluent streams and the pressure of the system at or near ground level, relying upon operational data to attempt to determine the actual reaction temperatures. This method of temperature sensing, however, is a poor substitute for actual reaction temperatures, particularly where accurate control of the reaction temperatures is desired for optimum control of the reaction vessel to achieve maximum C.O.D. reduction. The apparatus and methods of this invention are particularly adapted for accurate determination and control of the temperature of the reaction zone, while avoiding fouling of thermocouples and permitting easy replacement of the temperature measurement devices.

In the preferred embodiment of this invention, the temperature sensing means for the reaction zone of the fluid treatment apparatus is located in the heat exchanger 22. As will be understood from the description of the heat exchanger above, heat exchange fluid is normally circulating in the heat exchanger and the temperature and flow of the heat exchange fluid is controlled to control the temperature of the reaction zone. Thus, it was not believed to be possible to accurately determine the temperature of the reaction zone from the temperature of the heat exchange fluid. It was discovered, however, that the temperature of the reaction zone could be accurately determined from the temperature of the heat exchange fluid in a quiescent zone 130 located at the lower extent of the heat exchanger. The quiescent zone 130 is created by spacing the open end 26 of the first or inner tube 24 of the heat exchanger from the closed end 30 of the outer or second pipe 28 a distance sufficient to staguate the flow. Where the spacing is sufficient to stagnate the flow of heat exchange fluid adjacent the closed end 30 of the second tube 28, a reservoir of fluid is created in intimate heat transfer relation with the lower extent of the reaction zone of the reaction vessel. The temperature of the fluid in the quiescent zone was found to be an accurate indicator of the temperature in the reaction vessel. Further, the difference between the temperature of the heat exchange fluid in the quiescent zone and the temperature of the reaction zone can be quantified for very accurate determination of the temperature of the reaction zone.

In actual operation, it was found that the temprature of the hot oil in the quiescent zone was about 10° to 20° F. greater than the temperature of the reaction zone as the influent was heated by the heat exchanger prior to exothermic reaction. When the reactor becomes autogenic, the difference between the temperatures decreases until the temperature of the reaction zone exceeds the temperature of the heat exchange fluid in the quiescent zone by about the same differential. Continuous autogenic operation of the reaction vessel results in a temperature in the reaction zone which is greater than the temperature of the oil in the quiescent zone. FIG. 6 illustrates a typical operation of the reaction vessel wherein the hot oil temperature in the quiescent zone is plotted against the temperature of the influent in the reaction zone. As shown, the reaction became autogenic, at about reference numeral 130, after about eight hours of operation. In fact, the temperatures may repeatedly cross as the system flows into and out of autogenic operation. In actual operation, it was found that the temperature of the hot oil in the insulated tubular was greater than the temperature of the hot oil in the quiescent zone, which was greater than the temperature of the reaction zone during start-up, prior to autogenic operation of the reaction vessel. During autogenic operation of the vessel, the temperature of the reaction zone was greater than the temperature of the heat transfer fluid in the quiescent zone, which was greater than the temperature of the heat exchange fluids circulating in the heat exchanger. The difference between the temperature of the influent in the reaction zone and the temperature of the heat transfer fluid in the quiescent zone was found to be 10° to 20° F. It was further found that the open end 26 of the first pipe 24 of the heat exchanger should be spaced from the closed end 30 of the second pipe a distance of at least five feet, or more preferably at least ten feet, to provide a quiescent zone, as described.

Figure 4:
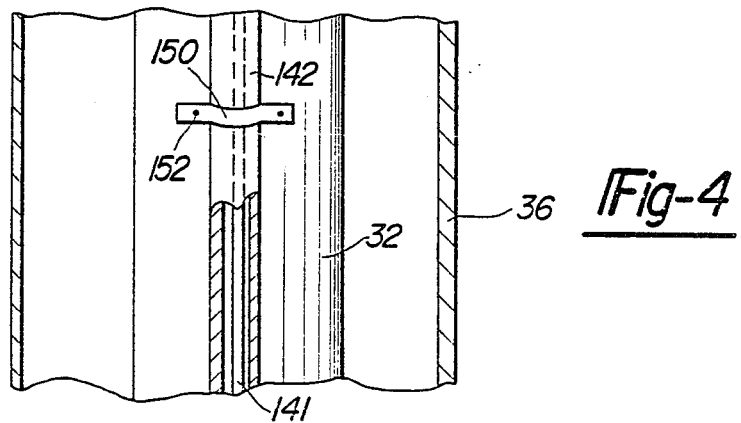
FIG. 4 is a side cross-sectional view of the reaction vessel during installation of a thermowell.

Having determined that the temperature of the heat transfer fluid in the quiescent zone 130 was an accurate indicator of the temperature of the influent in the reaction zone, it was then possible to accurately and continuously monitor the temperature of the reaction zone and more accurately control the operation of the reaction vessel. As will now be understood, the heat transfer fluid, such as oil, water-steam, etc. will normally be inert to a conventional thermocouple. Thus, the problem of fouling of the thermocouples was substantially eliminated. The temperature of the heat transfer fluid in the quiescent zone 130 was accurately determined by a conventional thermocouple rod 140 as best shown in FIGS. 1 to 3.

Where the thermocouple is to be located within the reaction vessel, such as for determination of scale build-up, the thermocouple is preferably located in a thermowell 142, as shown in FIG. 4, which comprises a tube having an opening adjacent the temperature sensing means. As will be understood, the thermowell pipe protects the thermocouple rod 141 and further isolates the thermocouple from the flow of the influent or reaction products. The thermowell is preferably free to permit removal, repair or replacement of the thermocouple. A unique method of locating the thermowell 142 in the reaction vessel was then developed, as now described. First, the thermowell 142 was attached to one of the pipes of the reaction vessel, such as pipe 32, by clamps 150, as shown in FIG. 4. The pipe 32 was then lowered into the reaction vessel and installed by conventional means. The clamps 150 were then removed by circulating a fluid through the reaction vessel which preferentially attacked the attachment means, releasing the thermowell 142. The clamps were made of a relatively soft carbon steel which in the embodiment shown in FIG. 4 were attached to the outside surface of pipe 32 by spot welding at 152. The clamps were then removed by a nitric acid wash. Finally, the thermocouple 141 was telescopically disposed into the thermowell 142, as shown in FIG. 4. The thermowell and thermocouple can then be easily removed, as needed, for repair or service.

Having provided a means for accurate monitoring of the temperature of the influent stream in the reaction zone, it was then possible to more accurately control the temperature of the reaction zone. As described above, the adjustment of the temperature of the reaction zone was previously accomplished solely with the heat exchanger 22. When the temperature of the reaction zone was to be increased, as during initiation of the wet oxidation reaction, hot oil was circulated downwardly through the insulated tubular 24, as shown by arrow 70 and upwardly through the annular space between the insulated tubular 24 and the second tube 28, as shown by arrows 72, in heat fluid transfer with the influent in the downcomer pipe 32. When the temperature was to be decreased, the circulation was reversed, as shown in FIG. 3, wherein cooled oil received from heat exchanger 54 was circulated downwardly through the annular space between the insulated tubular 24 and the second pipe 28, as shown by arrow 70A and upwardly through the insulated tubular, as shown by arrow 72A of FIG. 3. Further or alternative adjustment of the reaction zone temprature was, however, found to be desirable. This adjustment was made by adjusting the C.O.D. of the influent. When the temperature was to be increased, the concentration of the primary reactant, which was sewage sludge, was increased in the carrier fluid, which was water. When the temperature was to be decreased, the concentration of the sewage sludge in water was decreased. This was found to be a very accurate means of controlling the temperature of the reaction zone. In fact, in some applications, it may be possible to eliminate the heat exchanger and control the temperature of the reaction zone by controlling the C.O.D. of the influent.

The thermowell 142 may also be used to measure the pressure at the bottom of the thermowell simultaneously with the temperature. A source of gas under pressure, such as pump 156 is connected by pressure line 158 to the top of the thermowell 142 as shown in FIG. 1. The gas is then pumped under pressure into the thermowell until it just bubbles out of the open end 144 of the thermowell. The pumping pressure corrected for the weight of the fluid in the thermowell, is then the pressure of the fluid at the depth of the open end 144 of the thermowell. In FIG. 1, a temperature gauge and control 160 is connected to the thermocouple to determine the temperature of the reaction zone which may also be connected to valves 50 and 60 to control the circulation of the heat transfer fluid for heating or cooling the reaction zone, as described above. As will be understood, the method of locating the thermowell in the fluid treatment apparatus and method of determining pressure may also be used in the reaction vessel.

Figure 5:
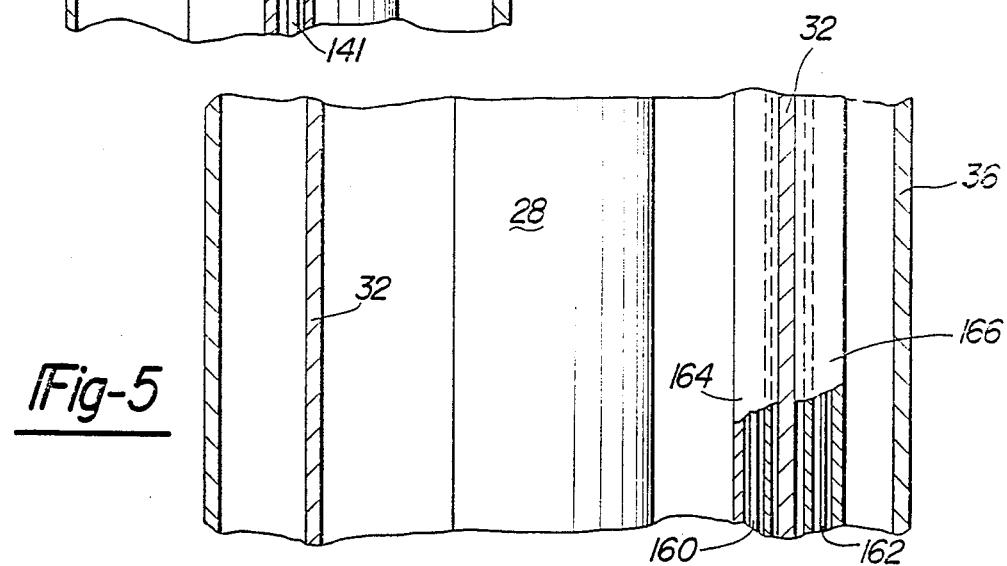
FIG. 5 is a partial side cross-sectional view of a further embodiment of the reaction vessel and means of determining scale build-up on the reactor wall.

FIG. 5 illustrates an apparatus and method for determining the scale build-up on reactor vessel wall 32. Temperature sensing means are located on opposite sides of pipe 32, within the reaction vessel. In the disclosed embodiment, the temperature sensing means are thermocouples 160 and 162 located on opposite sides of wall 32. In the preferred embodiment, the thermocouples 160 and 162 are thermocouple bundles, wherein each thermocouple of the bundle measures the temperature at a predetermined depth. As described above, the thermocouples 160 and 162 located within the reaction vessel are preferably located within thermowells 164 and 166, respectively. The thermowells may either be filled with a liquid or a gas may be pumped into the thermowells for determination of pressure, as described hereinabove. The thermocouples therefore determine the temperature on opposite sides of wall 32 at preselected depths within the reaction vessel.

The preferred method of determining scale build-up on reaction vessel wall 32 comprises measuring the temperature differential on opposite sides of wall 32 at the same depth at timed intervals. An increase in the temperature differential indicates scale build-up on the reaction vessel wall. It is therefore possible to determine when the reaction vessel must be cleaned of scale by determining the temperature differential on a periodic basis. Several prior patents and pending applications for United States patent have been referred to herein which disclose further details of the preferred reaction apparatus and methods and the disclosures of such patents and pending applications are incorporated herein by reference. Further details will be understood by those skilled in the art. For example, the deep well reaction apparatus 20 may be installed in a conventional cased well. The materials, dimensions, etc. will depend upon the particular application for the deep well reaction apparatus and methods. The thermowell tube 142 is preferably formed of a material similar to the material used for the reaction vessel pipes, which is a corrosion resistant steel having elevated temperature service capability. Further, modifications may be made to the disclosed embodiment of the reaction vessel and heat exchanger without departing from the purview of the appended claims. For example, as described above, the downcomer pipe 32 and heat exchanger 24 may be located side by side within the reaction vessel, increasing the capacity of the reaction vessel in a predetermined diameter well casing. Having described the fluid treatment apparatus and methods of this invention.

We now claim the invention, as follows.

1. A method of determining the reaction temperature of a subterranean reaction apparatus for continuous treatment of fluidized wastes while avoiding fouling of the temperature sensing means, said apparatus including a plurality of nested pipes extending generally vertically into the ground a predetermined depth to establish the desired pressure for treatment of said waste at the reaction temperature, said pipes receiving influent including at least two reactants, transferring said influent downwardly into a reaction zone to establish said predetermined pressure and transferring the effluent reaction products of said reactants upwardly out of said reaction apparatus, and a heat exchanger disposed in said nested pipes in heat transfer relation with said downwardly flowing influent, said heat exchanger including a first tube having an open end extending downwardly within said reaction zone and a second tube surrounding said first tube in spaced relation having a closed end, said tubes receiving a heat transfer fluid therethrough for heating and cooling said downwardly flowing fluidized waste, said method comprising:
    (a) establishing and maintaining a fluid quiescent zone adjacent said closed end of said heat exchanger second tube during flow of said heat transfer fluid through said tubes by spacing said open end of said first tube a predetermined distance from said closed end of said second tube to stagnate the flow of said heat transfer fluid adjacent said closed end of said second tube; and
    (b) sensing the temperature of said heat transfer fluid in said fluid quiescent zone adjacent said closed end of said heat exchanger second tube.

2. A method of continuous treatment of fluidized waste in a subterranean reaction apparatus, said apparatus including a plurality of nested pipes extending generally vertically into the ground a predetermined depth to establish the desired pressure for treatment of said waste at the reaction temperature, said pipes receiving an influent including said fluidized waste having at least two reactants, transferring said influent downwardly into a reaction zone to establish said predetermined pressure and transferring the effluent reaction products of said influents upwardly out of said reaction apparatus, and a heat exchanger disposed in said nested pipes in heat transfer relation with said downwardly flowing influent, said heat exchanger including a first tube having an open end extending downwardly within said reaction zone and a second tube surrounding said first tube in spaced relation, said tubes receiving heat transfer fluid therethrough for heating and cooling said downwardly flowing influent in said reaction zone, said method comprising:
    (a) initiating the reaction of said influent reactants by flowing hot heat transfer fluid downwardly through said heat exchanger first tube and circulating said heat transfer fluid upwardly through said annular space between said first and second tubes in heat transfer relation with said downwardly flowing influent;
    (b) establishing and maintaining a fluid quiescent zone adjacent said heat exchanger second tube closed end by spacing said open end of said first tube from said closed end of said second tube a distance sufficient to stagnate the flow of said heat transfer fluid adjacent said closed end of said second tube;
    (c) sensing the temperature of said heat transfer fluid in said heat exchanger fluid quiescent zone; and
    (d) reversing the flow of said heat transfer fluid in said heat exchanger tubes when said sensed temperature reaches a predetermined maximum temperature by flowing said heat transfer fluid downwardly through said annular space between said first and second tubes and recirculating said heat transfer fluid upwardly through said first tube.

3. The method of continuous treatment of fluidized waste defined in claim 2, wherein said influent includes an oxidizable waste material comprising a first reactant dilluted in water and the second reactant is oxygen, said method including initiating an exothermic wet oxidation reaction in said reaction zone, reversing said flow of heat transfer fluid when said wet oxidation reaction becomes autogenic, and thereafter adjusting the temperature in said reaction zone by increasing the concentration of said oxidizable waste material when the temperature sensed in said fluid quiescent zone decreases below a predetermined minimun temperature and decreasing the concentration of said oxidizable waste material when the temperature sensed in said fluid quiescent zone increases above a predetermined maximum temperature.

4. A method of continuous treatment of an oxidizable waste material comprising a first reactant dilluted in water and oxygen comprising a second reactant in a subterranean reaction apparatus, said method comprising the following steps:
    (a) flowing an influent of said oxidizable waste material and water through a downflowing passage into a reaction zone at a predetermined depth;
    (b) flowing a hot heat transfer fluid downwardly in a heat exchanger into said reaction zone initiating an exothermic wet oxidation reaction between said oxidizable material and oxygen;
    (c) flowing the reaction products of said wet oxidation reaction upwardly through an upflowing passage in fluid heat transfer relation with said influent in said downflowing passage;
    (d) establishing and maintaining a fluid quiescent zone adjacent the lower extent of said heat exchanger by stagnating the flow of heat transfer fluid adjacent said lower extent, and continuously measuring the temperature of said heat transfer fluid in said fluid quiescent zone;
    (e) increasing the concentration of said oxidizable waste material and oxygen in said influent when said temperature decreases below a predetermined minimum temperature and decreasing the concentration of said oxidizable waste material and oxygen when said temperature increases above a predetermined maximum temperature.

* * * * *